July 7, 1959
W. C. BUBNIAK
2,893,699
REGENERATOR AND SEAL THEREFOR
Filed Dec. 20, 1956
5 Sheets-Sheet 3
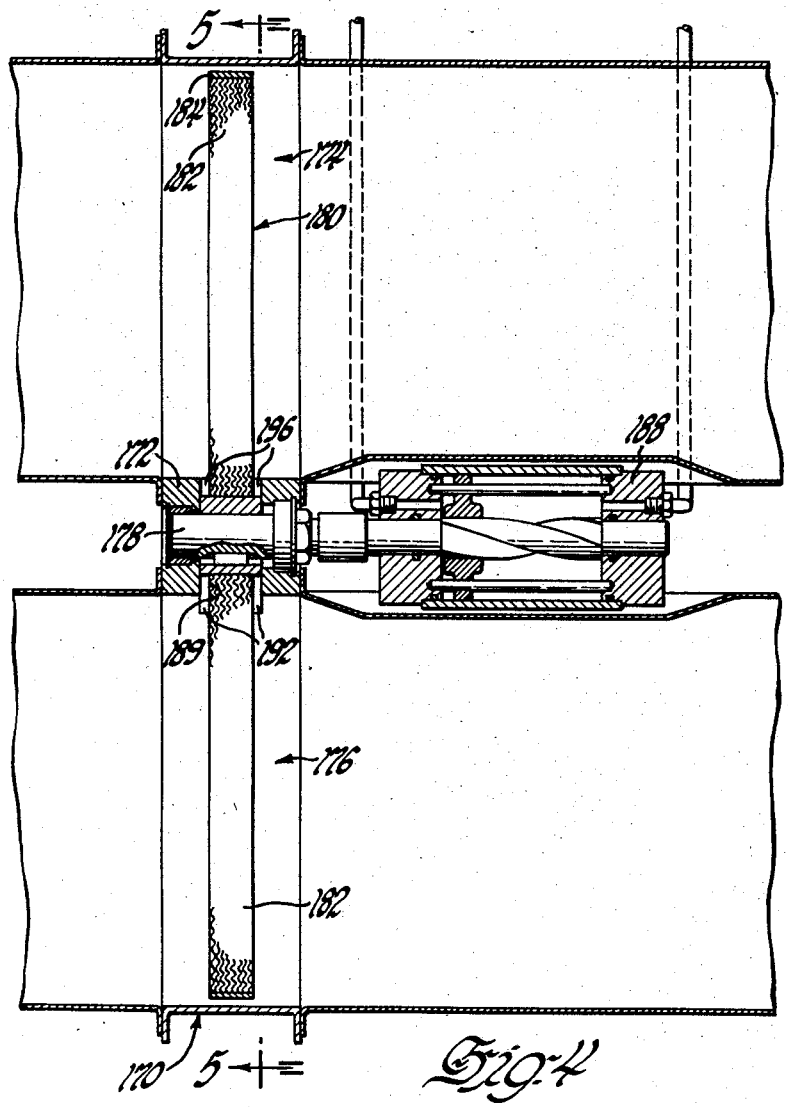
INVENTOR.
William C. Bubniak
BY
E. W. Christen
ATTORNEY July 7, 1959 W. C. BUBNIAK 2,893,699
REGENERATOR AND SEAL THEREFOR
Filed Dec. 20, 1956 5 Sheets-Sheet 4

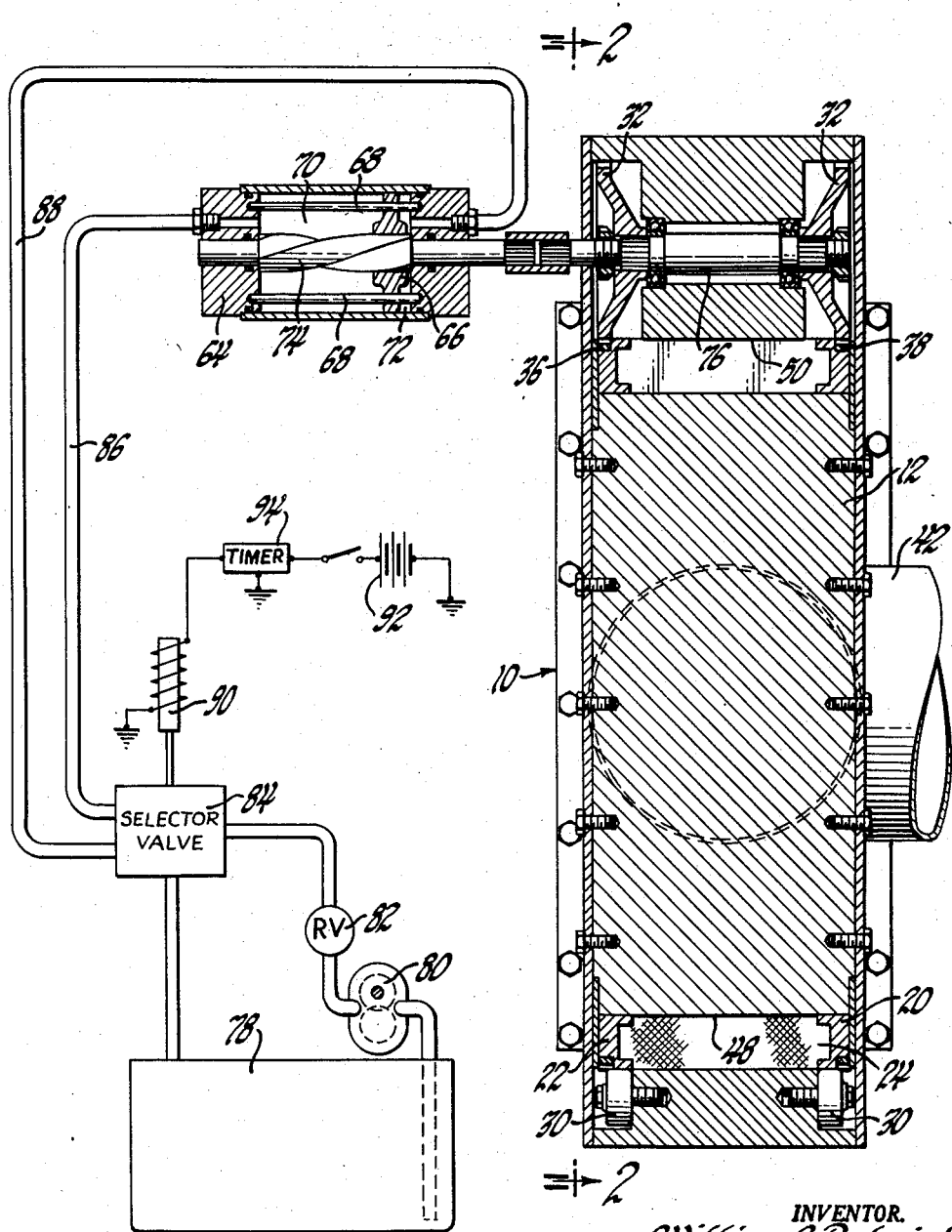

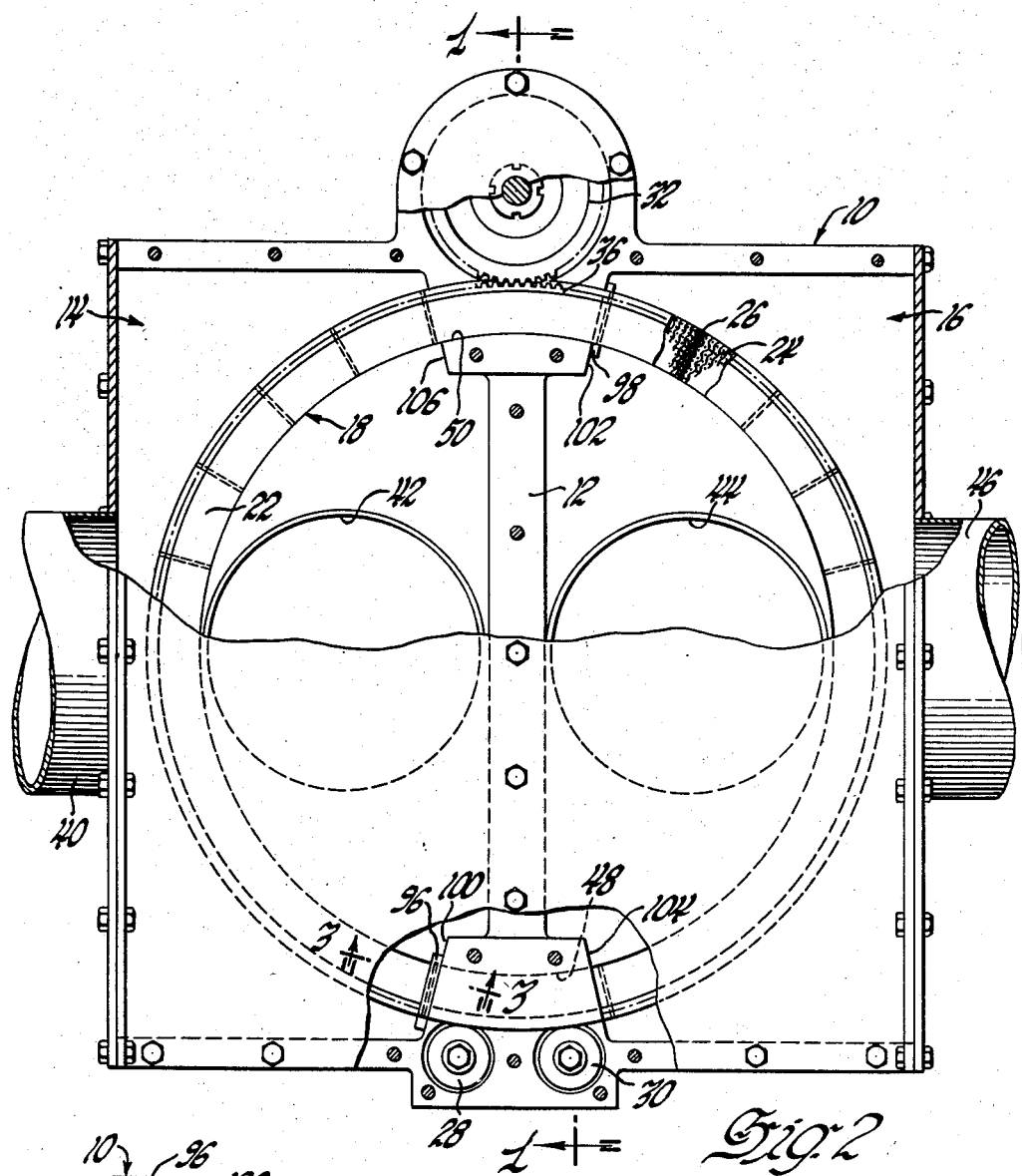

INVENTOR.
William C. Bubniak
BY
E. W. Christen
ATTORNEY

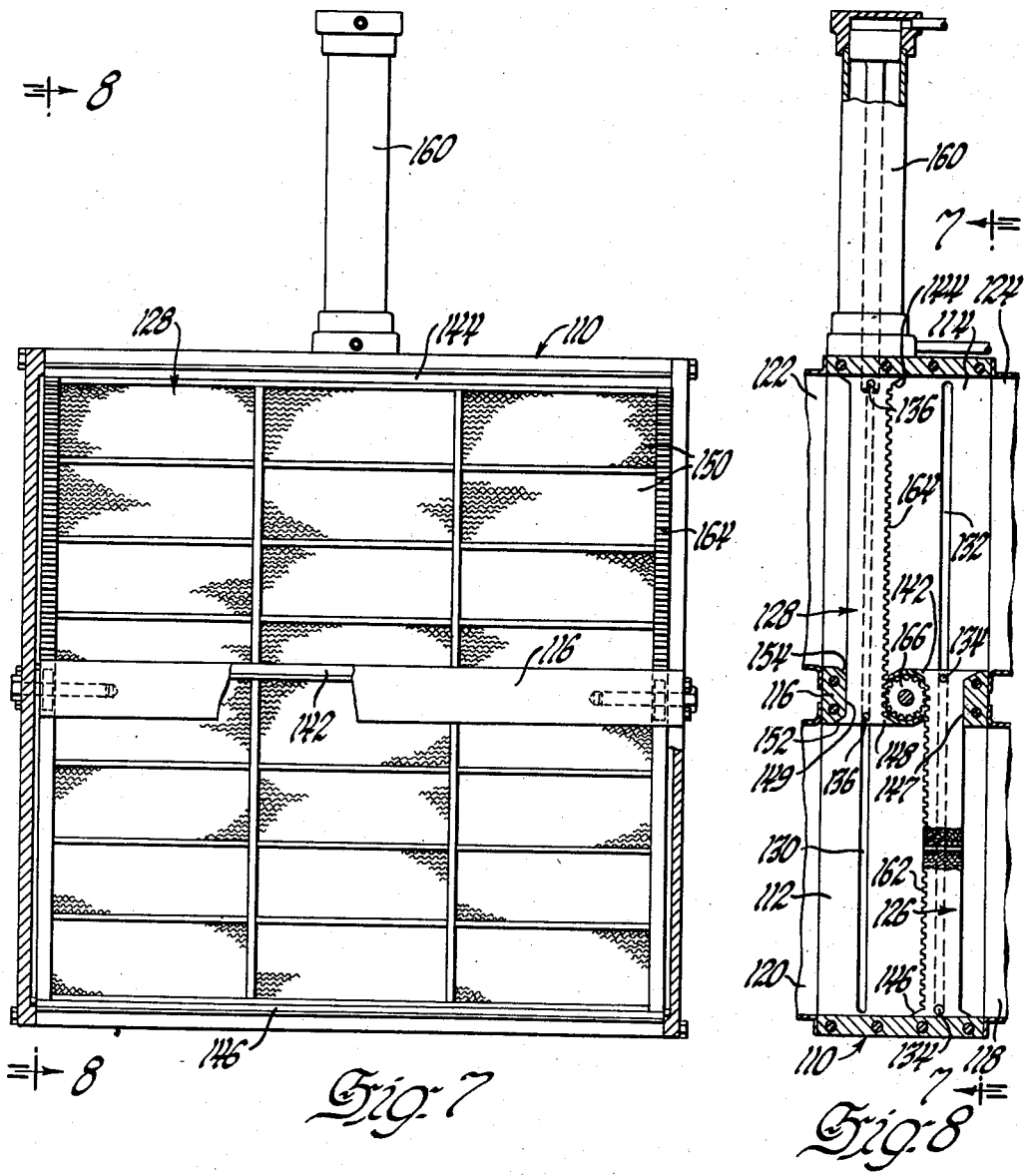

United States Patent Office 2,893,699
Patented July 7, 1959

2,893,699

REGENERATOR AND SEAL THEREFOR

William C. Bubniak, Warren, Mich., assignor to General Motors Corporation, Detroit, Mich., a corporation of Delaware Application December 20, 1956, Serial No. 629,746

7 Claims. (Cl. 257—6)

This invention relates to regenerative heat exchangers and more particularly to a sealing arrangement for regenerators that employ movable matrices.

These regenerators, in general, comprise a housing having separate hot and cold fluid passages and a matrix movable in the passages to soak up heat from the hot fluid to transfer the heat to the cold fluid. The regenerators are commonly used with gas turbine power plants to absorb waste heat from the turbine exhaust gases and to transfer the heat to the air passage of the power plant at some point upstream of the combustor. Various matrix designs are employed in regenerators, for example, the matrix may take the form of a drum or disk which is partially housed in the hot fluid passage and which is partially housed in the cold fluid passage so that oscillation of the matrix will transfer heat between the passages. In addition to these oscillatory types of annular matrices, the regenerator may employ a pair of separate box-like matrices which are each reciprocated from one passage to the other to effect the heat transfer.

Regardless of the type of regenerator matrix, some means must be provided to reduce fluid leakage between the hot and cold fluid passages which have, in the usual case, a substantial fluid pressure differential therebetween. The usual regenerator employs a closely spaced partition seal about the matrix to separate the hot and cold fluid passages and is subject to fluid leakage where the matrix passes through the partition seal from one passage to the other.

The present invention reduces fluid leakage between the passages to a minimum. The matrix of a regenerator of either the oscillating or reciprocating type need only be in movement a small portion of its operative time; that is, the matrix may remain stationary in the hot and cold fluid passages for a relatively long period of time while it soaks up heat in one passage and gives off heat in the other, and may then be moved in the passages in a relatively short period of time to relocate its heat exchange structure. The invention provides a close running-fit partition seal during the short duration movement period of the matrix and provides a positive-pressure partition seal during the long duration stationary heat transfer period.

In the drawings:

Figure 1 is a transverse section of a drum type regenerator incorporating the positive matrix seal of the invention and taken substantially on the plane indicated by the line 1—1 of Figure 2;

Figure 2 is a side elevation, partially broken away, of the drum type regenerator and taken substantially on the plane indicated by the line 2—2 of Figure 1;

Figure 3 is a partial section of the positive seal of the drum type regenerator taken substantially on the plane indicated by the line 3—3 of Figure 2;

Figure 4 is a vertical section of a disk type regenerator incorporating the positive seal of the invention and taken substantially on the plane indicated by the line 4—4 of Figure 5;

Figure 7 is a front elevation of a reciprocating type regenerator employing the positive seal of the invention; and Figure 8 is a vertical section of the reciprocating type of regenerator taken substantially on the plane indicated by the line 8—8 of Figure 7.

Figure 5:
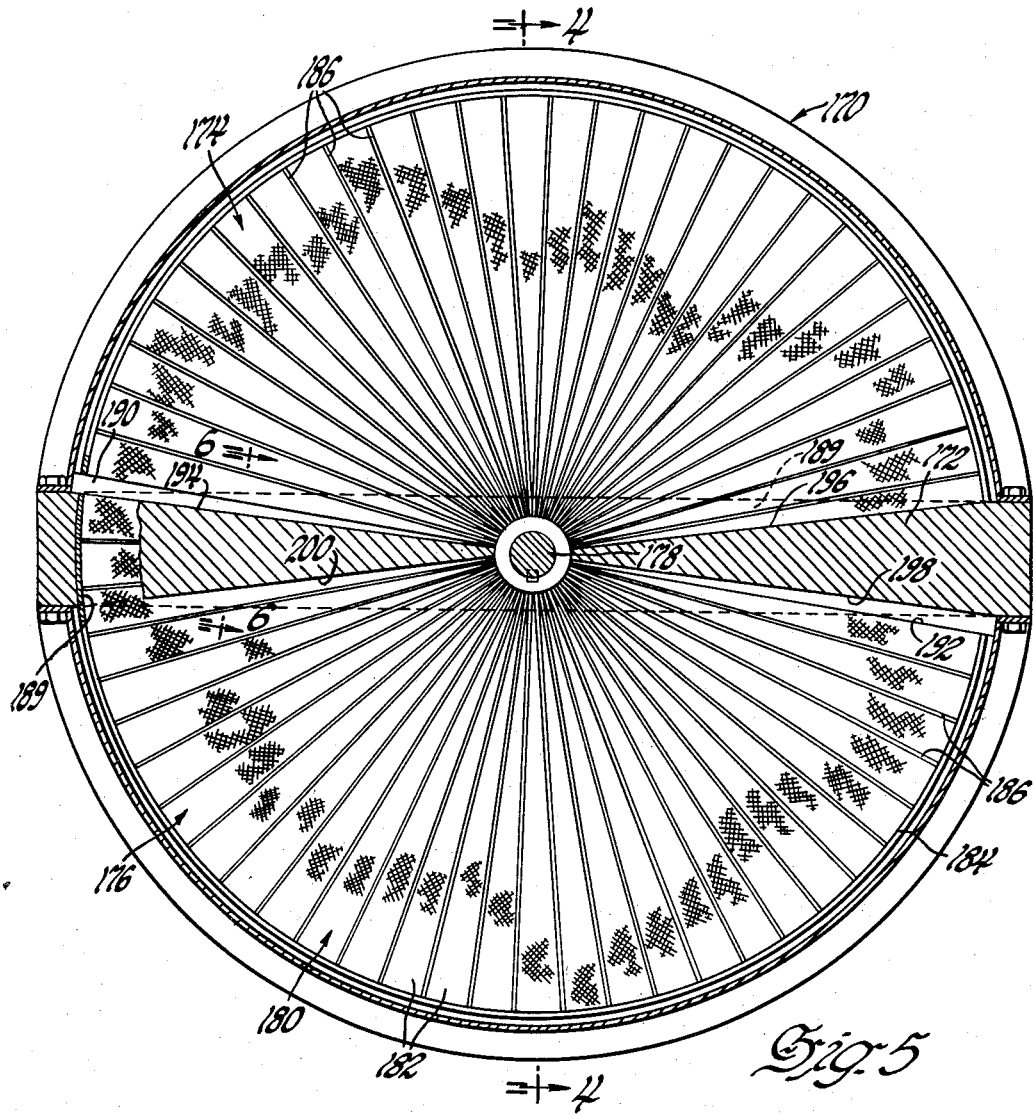
Figure 5 is a transverse section of the disk type regenerator taken substantially on the plane indicated by the line 5—5 of Figure 4.

Referring now to Figures 1 to 3, the drum type regenerator comprises a rectangular casing or housing 10 having central diaphragm or partition 12 therein which divides the housing into a cold fluid chamber 14 and a hot fluid chamber 16. A drum matrix 18 of known construction is located in the housing 10 with its periphery divided between the cold and hot fluid chambers 14 and 16. The drum 18 is an assembly of a pair of end rings 20 and 22 which support a multitude of thin radially disposed sheets and screens 24 which are alternatingly stacked in circumferential direction to provide a multitude of passages through the periphery of the drum whereby fluid can flow through the drum in a radial direction. Radial partitions 26 are secured intermittently about the periphery of the drum for structural integrity.

The drum 18 is mounted for oscillatory movement in the housing 10 by a circumferentially spaced pair of roller sets 28 and 30 and by a drive pinion set 32 which engage the supporting rings 20 and 22 of the drum. The supporting rings 20 and 22 of the drum are provided with gear teeth 36 and 38 that mesh with the pinion set 32.

Cold fluid is supplied to the regenerator chamber 14 by a conduit 40 to pass radially inwardly through the drum 18 and axially out the open end of the drum 18 to discharge through an outlet conduit 42. Hot fluid is transmitted to the regenerator chamber 16 by a conduit 44 for axial entry into the interior of the drum 18 and for radial outward passage through the drum to discharge by way of an outlet conduit 46. The drum 18 has a close-fit running seal with the partition 12 where it passes through cross-chamber passages 48 and 50 in the ends of the partition. Each of the cross-chamber passages forms a peripheral seal about a radial segment of the drum.

It is apparent that heat will be transferred from the hot fluid chamber 16 to the cold fluid chamber 14 if the drum is intermittently oscillated to move its heated portion into the cold chamber and its cold portion into the hot chamber. Any suitable mechanism may be utilized to provide a time-delay oscillation of the drum, and in the illustrated arrangement the mechanism comprises a hydraulic cylinder 64 having a piston 66 keyed therein by pins 68 for pure reciprocal movement on alternate pressurization of the hydraulic actuating chambers 70 and 72. A screw shaft 74 is threaded in the piston 66 and drives the pinion set 32 by a shaft 76 whereby reciprocation of the piston will rotate the pinion set in alternate directions to oscillate the drum 18. Reciprocation of the piston 66 is afforded by a conventional hydraulic system which includes an oil reservoir 78, an oil pump 80, a relief valve 82 and a hydraulic selector valve 84 which alternately pressurizes the chambers 70 and 72 through conduits 86 and 88. As previously noted it is desirable that the drum 18 remain stationary for a relatively long interval after each oscillation, and the hydraulic selector valve 84 is therefore operated periodically by means of a valve control solenoid 90 which is energized periodically from a battery 92 by means of a timer switch 94.

The sealing arrangement thus far described is a running seal where the drum 18 passes through the passages 48 and 50 in diaphragm 12 and will permit some cross flow of fluid between the hot and cold fluid chambers 14 and 16 since sufficient clearance is necessarily present to allow oscillation of the drum, and the invention is concerned with reducing this fluid leakage between the chambers to an absolute minimum. The invention accordingly provides a positive-pressure type seal between the chambers whenever the drum is stationary with the net result being a highly efficient seal throughout the operation of the regenerator inasmuch as the drum is stationary most of the time (for example, the drum need be in motion but 10% of the time that the regenerator is operative).

The inventive seal comprises a pair of spaced rectangular rings 96 and 98 which encircle radial segments of the drum and which are secured thereto to positively engage seat portions 100 and 102 that form the outer surfaces of the entrances of the passages 48 and 50. Referring particularly to Figure 2, it will be seen that the upper sealing ring 98 of the drum 18 is in positive sealing engagement with the upper seat surface 102 of the diaphragm 12 and that the lower sealing ring 96 is in positive engagement with the lower seat surface 100 of the diaphragm so that fluid flow between the chambers 14 and 16 cannot take place while the drum is in the stationary or rest position shown. When the drum is rotated clockwise by the hydraulic actuator 64 during the movement period, the upper sealing ring 98 of the drum will engage a lower sealing surface 104 on the diaphragm 12 and the lower sealing ring 96 will engage an upper sealing surface 106 to begin a new rest period whereby fluid leakage between the chambers 14 and 16 is absolutely prevented during the matrix rest periods. Briefly stated, the drum sealing rings 96 and 98 comprise a means to positively seal against leakage between the hot and cold fluid passages of the regenerator during the greater part of regenerator operation.

Referring now to Figures 7 and 8 the positive matrix seal of the invention is shown as applied to a reciprocating matrix type of regenerator. The regenerator includes a rectangular casing or housing 110 which is divided into hot and cold fluid chambers 112 and 114 by a horizontal wall or diaphragm 116. Conduits 118 and 120 transfer hot fluid through the chamber 112 while conduits 122 and 124 transfer cold fluid through the chamber 114. A pair of rectangular heat exchange matrices 126 and 128 are slidably mounted for alternate reciprocation between the hot and cold fluid chambers by means of guide slots 130 and 132 formed in the side walls of the housing 110 and engaged by guide pins 134 and 136 secured to the side walls of the matrices. Matrices 126 and 128 have solid rectangular outer walls, the upper walls being flanged at 142 and 144 and the lower walls being flanged at 146 and 148. The interior of the matrices may be provided with laminar stacks of strips and screening 150 to serve as a porous heat exchange mass.

Referring particularly to Figure 8, it is seen that the matrices 126 and 128 pass through complementary crosschamber passages 147 and 149 in the diaphragm 116 and that the diaphragm is provided with tapered sealing shoulders or seats to positively engage the matrix sealing flanges. When the matrix 128 is in the up rest position shown, its sealing flange 148 engages a sealing shoulder or seat 152 of the diaphragm 116 and when it is shifted to the rest down position, its sealing flange 144 will engage a diaphragm sealing shoulder 154. The sealing flanges 142 and 146 of the matrix 126 likewise engage complementary sealing shoulders on the diaphragm 116 when the matrix is shifted from one fluid chamber to the other for each rest period.

A hydraulic actuator 160 connects to the matrix 128 to rest and reciprocate the same at timed intervals in a manner similar to that described in conjunction with the drum type regenerator. Rack teeth 162 and 164 are provided on the side walls of the matrices 126 and 128 to engage a pinion 166 which is rotatably supported by the diaphragm 116 so that movement of one matrix from one chamber to the other will cause an opposite chamber movement of the other matrix.

Figure 6:
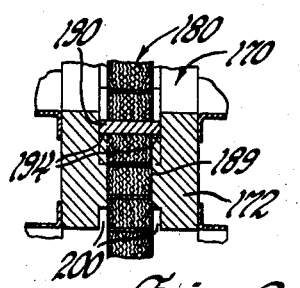
Figure 6 is a partial section of the positive seal of the disk type regenerator taken substantially on the plane indicated by the line 6—6 of Figure 5.

Referring now to Figures 4, 5 and 6, the inventive regenerator seal is shown as applied to a disk type matrix. The regenerator comprises a cylindrical housing 170 which is split by a generally diametral diaphragm 172 into hot and cold fluid chambers 174 and 176. The diaphragm 172 rotatably mounts a shaft 178 which carries a disk matrix 180 which includes a plurality of pie-shaped porous heat exchange screen masses 182 retained in assembly by an outer ring 184 and by a plurality of radial ribs 186. Oscillation and resting of the disk matrix 180 is afforded by a hydraulic cylinder 188 in a manner similar to that described in conjunction with the drum type regenerator.

Since the disk matrix 180 passes through a vertical slot 189 in the diaphragm 172 with sufficient clearance to permit rotation, the disk 180 has secured therethrough a pair of opposed U-shaped seals 190 and 192 which positively engage opposite seat surfaces on the diaphragm 172. Referring particularly to Figure 5, the disk seal 190 engages a diaphragm seat surface 194 at one limit of oscillation and a diaphragm seat surface 196 at the other limit of oscillation while the disk seal 192 engages diaphragm seat surfaces 198 and 200 at its limits of oscillation. The disk type regenerator is therefore provided with a positive seal between its hot and cold fluid chambers throughout the major portion of its period of operation.

While the embodiments of the present invention as herein disclosed constitutes preferred forms, it is to be understood that other forms might be adopted.

What is claimed is:

1. A regenerative heat exchanger comprising a housing forming a pair of fluid transfer chambers separated from each other by intermediate wall structure, a matrix in the housing having one portion located in one of the chambers and another portion located in the other chamber, the matrix passing through closely fitting passages in the wall structure, means for shifting the matrix portions through the passages from one chamber to the other at regular intervals and for providing matrix rest periods between shifts, the matrix rest periods being of greater duration than the matrix shift periods, and sealing structure secured to each matrix portion at a local area thereof to forcibly engage the wall structure proximate the passages at the termination of each shift to prevent fluid leakage between the chambers during the matrix rest periods, said sealing structure being disengaged from said wall structure during the matrix shift periods.

2. A regenerative heat exchanger in accordance with claim 1 wherein the matrix comprises a rotatable annular drum with one portion thereof being located in the one chamber for movement into the other chamber and the other portion thereof being located in the other chamber for movement into the one chamber.

3. A regenerative heat exchanger in accordance with claim 2 wherein the sealing structure comprises a pair of rings each encircling a radial section of the drum and being peripherally spaced from each other on the drum, the rings being located on opposite sides of the wall structure.

4. A regenerative heat exchanger in accordance with claim 1 wherein the matrix comprises a pair of separate reciprocable portions with one portion being located in the one chamber for movement into the other chamber, and with the other portion being located in the other chamber for movement into the one chamber.

5. A regenerative heat exchanger in accordance with claim 4 wherein the sealing structure comprises flanges at each end of each of the matrix portions, the flanges for each of the matrix portions being located on opposite sides of the wall structure.

6. A regenerative heat exchanger in accordance with claim 1 wherein the matrix comprises a rotatable disk with one portion thereof being located in the one chamber for movement into the other chamber and the other portion thereof being located in the other chamber for movement into the one chamber.

7. A regenerative heat exchanger in accordance with claim 6 wherein the sealing structure comprises a ring substantially encircling a generally diametrical section of the disk, one half of the ring being located on one side of the wall structure and the other half of the ring being located on the other side of the wall structure.

References Cited in the file of this patent

UNITED STATES PATENTS

| | | |
|---|---|---|
| Re. 17,185 | Murray | Jan. 1, 1929 |
| 870,546 | Cooke | Nov. 12, 1907 |
| 2,678,193 | Stevens et al. | May 11, 1954 |
| 2,757,907 | Williams | Aug. 7, 1956 |

FOREIGN PATENTS

| | | |
|---|---|---|
| 543,093 | Great Britain | Feb. 10, 1942 |
| 477,757 | Germany | June 13, 1929 |
| 202,137 | Australia | June 6, 1956 |